Sept. 16, 1924.
C. GROVE
STOP SIGNAL FOR AUTOMOBILES
Filed Nov. 14, 1923
1,508,693
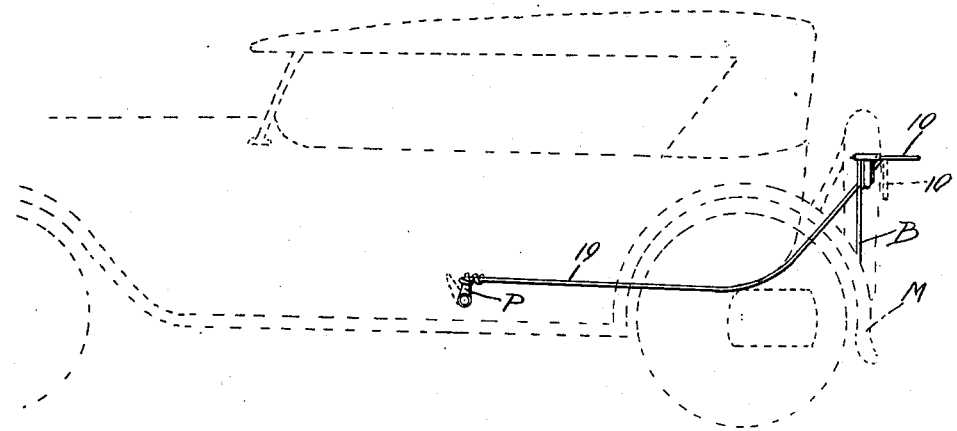
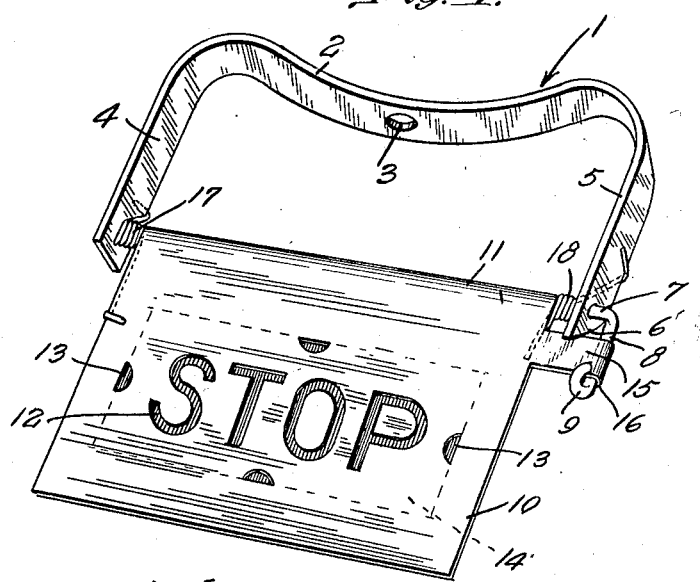
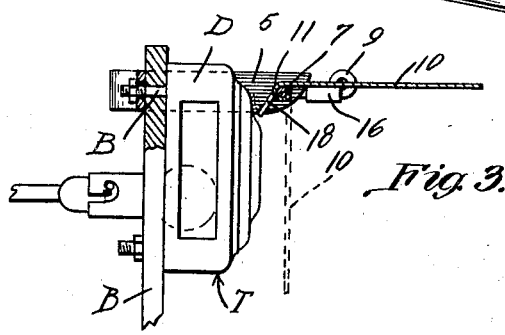
C. Grove,
Inventor.

Patented Sept. 16, 1924.

1,508,693

UNITED STATES PATENT OFFICE.

CLYDUS GROVE, OF SISTERSVILLE, WEST VIRGINIA.

STOP SIGNAL FOR AUTOMOBILES.

Application filed November 14, 1923. Serial No. 674,676.

*To all whom it may concern:*

Be it known that I, CLYDUS GROVE, a citizen of the United States, residing at Sistersville, in the county of Tyler and State of West Virginia, have invented a new and useful Stop Signal for Automobiles, of which the following is a specification.

This invention relates to stop signals for automobiles.

The object of the invention is to provide a simple and efficient signal of this character which may be readily applied to a tail light already in use without making any change therein and thereby adapting the one light to perform the double function of illuminating means for the signal and as the ordinary tail light.

Another object of the invention is to construct a signal of this character in the form of a plate having a transparent word formed thereon and which is constructed to be lowered in front of the tail light on the application of the brake and which will automatically raise when pressure on the brake pedal is removed.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Figure 1 represents a side elevation of a car equipped with this improved signal, the car being shown in dotted lines and the signal in full lines.

Fig. 2 is an enlarged detail perspective view of the signal; and

Fig. 3 is a side elevation partly in section of the signal shown applied to a tail light, the signal plate being shown in operative position in dotted lines and in inoperative position in full lines.

This signal may be applied to any make of car but is here shown in connection with a Chevrolet. This signal comprises a supporting bracket 1 designed to be mounted on the license bracket B which also supports the tail light T, said bracket being here shown mounted on the rear mud guard M the drum D of the tail light being held in place by two small bolts B′ one located at the top and one at the bottom of the drum as is shown clearly in Fig. 3.

The bracket 1 is shown U-shaped in form and constructed of a metal strap the cross bar 2 of which is apertured midway its length as shown at 3. To apply this bracket the nut is removed from the top bolt B and the bolt inserted through the aperture 3 in bracket 1 and the nut again screwed on. The arms 4 and 5 of bracket 1 are apertured at their terminals to receive a pivot rod 7 one end of which projects through arm 5 and has a laterally extending finger 8 with its terminal bent to form an eye 9.

The signal plate 10 which is fixedly secured to rod 7 to turn therewith is here shown rectangular in form although obviously it may be of any other desired configuration. The upper edge of this plate 10 is rolled as shown at 11 to receive rod 7 which is fixedly secured thereto in any desired manner. The plate 10 has the letters cut out to form the word "Stop" as shown at 12. Semi-circular ears 13 are pressed out above and below and at each end of the word "Stop" and are designed to form supports for a piece of isinglass 14 and which is preferably red so that the letters will show in the daytime as well as at night.

The plate 10 is provided at one edge near its upper portion with a lateral extension 15 the other end of which is rolled to engage the finger 8 of the pivot rod as is shown at 16 in Fig. 2.

Coiled springs 17 and 18 are mounted on the rod 7 between the arms 4 and 5 of bracket 1 and the adjacent edges of plate 10. These coiled springs have their terminals extended in opposite directions one of which engages an arm of bracket 1 and the other plate 10 so that the springs exert their tension to normally elevate plate 10 into the position shown in full lines in Figs. 1 and 3 in which position the plate is located above the tail light and the edge of said plate only is visible from an approaching vehicle.

A wire 19 is connected at one end with the eye 9 of the pivot rod and passes forward and is connected at its other end to the brake pedal P of the car. This wire 19 preferably has a coiled spring 20 located therein so that when the plate 10 is moved down as far as it will go by a pull exerted on wire 19 and a further push is exerted on the brake pedal the spring 20 will yield and prevent breakage of the parts of the signal.

From the above description it will be obvious that with a signal connected up as shown and described a pressure exerted on the brake pedal P will move it into the dotted line position shown in Fig. 1 and cause a pull to be exerted on wire 19 which will through the crank arm or finger operate to move the plate 10 downwardly into the dotted line position as shown in Figs. 1 and 3. In this position the plate will be located in front of the tail light which when lit will illuminate the red letters 12 of the signal causing them to stand out and clearly indicate to an approaching vehicle coming from behind that the vehicle carrying the signal intends to stop or change its course.

Immediately pressure on the brake pedal is released the wire 19 will move backward and the springs 17 and 18 will operate to lift plate 10 from in front of the tail light in the full line position shown in Figs. 1 and 3.

A signal constructed as shown and described may be very cheaply manufactured and easily applied and costs nothing to operate since the same bulb which lights the tail light, lights the signal.

Various changes in the form, shape, proportion and other minor details of construction may be made without departing from the principle or sacrificing any of the advantages of the claimed invention.

I claim:—

1. An automobile signal comprising a U-shaped bracket having an aperture midway the cross bar thereof to receive a fastening bolt, a pintle passing through the free ends of the arms of said bracket and having one end extended at right angles and bent to form an eye, a plate mounted on said pintle and having a lug extending laterally from one end thereof and engaged with the bent end of the pintle to provide for the turning of the plate on the turning of the pintle, coiled springs connecting said plate and bracket and adapted to normally hold the plate in raised position, and means connected with said pintle eye for swinging the plate downward in a plane at right angles to the bracket against the tension of the spring.

2. The combination with an automobile tail light; of a U-shaped bracket having the cross bar thereof adapted to be connected to the rear upper portion of the tail light and the arm to extend at opposite sides in advance of the tail light, a pintle mounted in said arms, a plate mounted on said pintle between said arms and having a laterally extending lug at one end, said pintle having a lateral extension engaged with said lug, a transparent signal carried by said plate, coiled springs mounted on the pintle and engaged with the plate and with the brackets and adapted to exert their tension to hold the plate in raised position with its edge facing approaching vehicles, and means for connecting the pintle with the brake pedal of a car whereby the application of the brake will lower the plate.

In testimony that I claim the foregoing as my own, I have hereto affixed my signature in the presence of two witnesses.

CLYDUS GROVE.

Witnesses:
S. THISTLE,
L. C. ASH.